United States Patent [19]

Ames et al.

[11] Patent Number: 4,816,759

[45] Date of Patent: Mar. 28, 1989

[54] INDUCTIVE SENSOR FOR DETECTING DISPLACEMENT OF ADJACENT SURFACES

[75] Inventors: Gregory H. Ames; William A. Holmgren; A. Lee Widener, all of Colorado Springs, Colo.

[73] Assignee: Kaman Corporation, Bloomfield, Conn.

[21] Appl. No.: 114,436

[22] Filed: Oct. 28, 1987

[51] Int. Cl.⁴ .......................... G01B 7/30; G01B 7/14; G01R 33/00
[52] U.S. Cl. .................... 324/207; 324/233; 324/236; 331/65; 340/870.32
[58] Field of Search ............... 324/207, 208, 233, 234, 324/236, 239, 243, 59, 61 QS, 61 QL; 336/45; 340/551, 572, 870.31, 870.32; 331/65

[56] References Cited

U.S. PATENT DOCUMENTS

| | | | |
|---|---|---|---|
| 2,438,197 | 3/1948 | Wheeler | 324/236 X |
| 3,500,373 | 3/1970 | Minasy | 340/572 |
| 3,526,886 | 9/1970 | Lubich | 324/243 X |
| 3,721,821 | 3/1973 | Blanyer | 324/234 X |
| 4,618,822 | 10/1986 | Hansen | 324/236 X |
| 4,638,250 | 1/1987 | Shen-Orr et al. | 324/208 X |
| 4,663,589 | 5/1987 | Fiori | 324/208 |

Primary Examiner—Gerard R. Strecker
Attorney, Agent, or Firm—McCormick, Paulding & Huber

[57] ABSTRACT

An inductive displacement sensor includes an oscillator circuit that is characterized by primary and secondary pairs of coils disposed on opposing surfaces of adjacent optical segments. Each coil in both coil pairs is alternately positioned along a respective axes perpendicular to a segment displacement axis. The secondary coils are respectively tuned to frequencies above and below the oscillator circuit resonant frequency. Any motion between segments along the displacement axis induces a detectable change in phase between the current and voltage of the oscillator signal.

10 Claims, 2 Drawing Sheets

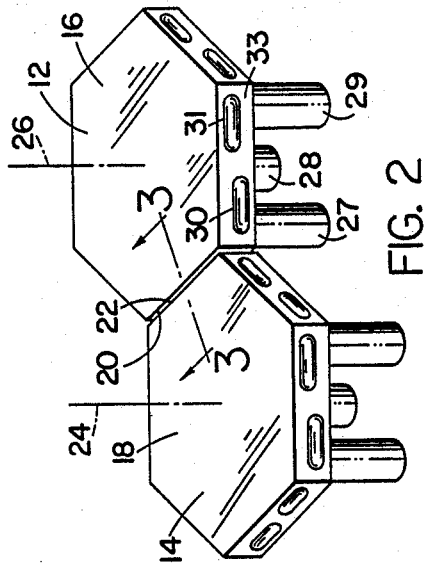
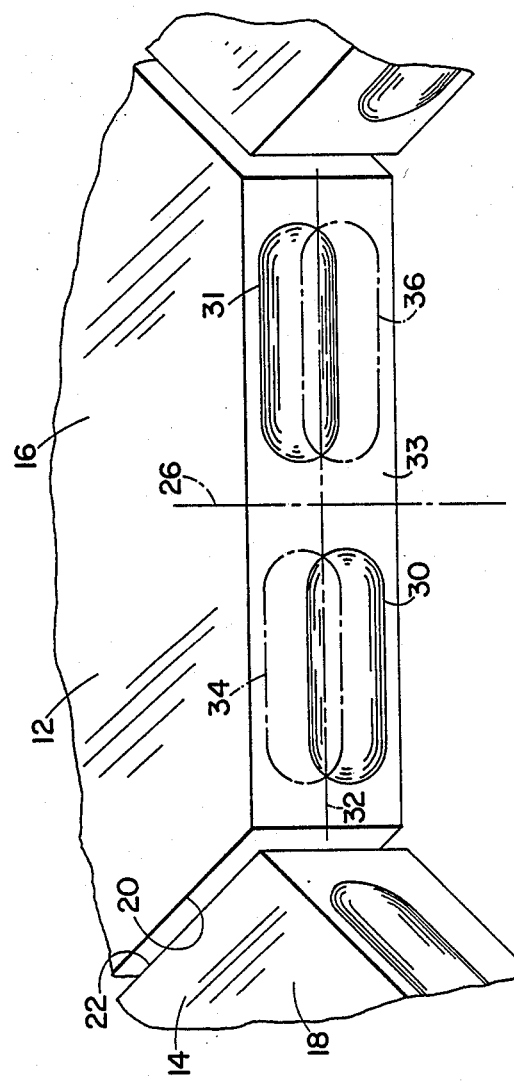
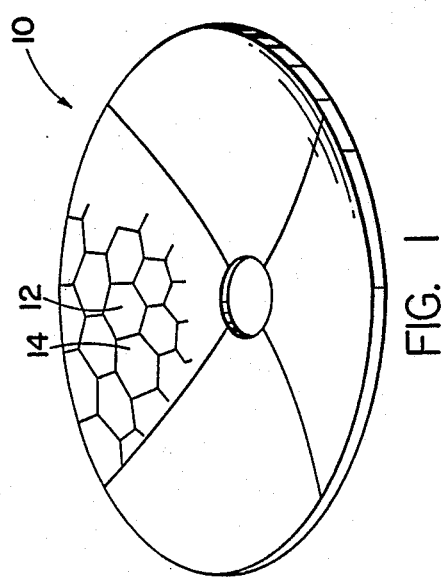
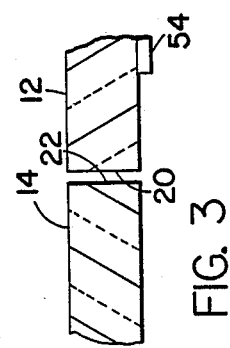

INDUCTIVE SENSOR FOR DETECTING DISPLACEMENT OF ADJACENT SURFACES

TECHNICAL FIELD

This invention relates to displacement sensors and more particularly to inductive displacement sensors for detecting movement between two generally parallel adjacent surfaces.

BACKGROUND OF THE INVENTION

Sensors for detecting relative in-plane or sliding displacement between adjacent parallel surfaces are well known in the art. Optical applications for such displacement sensors include precision alignment and/or positioning of optical elements, where high precision is required. An example of a segmented optical element is the primary mirror of the Keck telescope in Hawaii, a description of which can be found in the Keck Observatory Report number 90 published by the Keck Observatory, Lawrence Livermore Laboratories, Berkely, Calif. For example, in aligning the mirror segments of the Keck telescope, displacement sensors must indicate with subnanometer resolution when the reflective surfaces of adjacent segments are aligned.

Other optical applications place more stringent demands on these sensors. Adaptive optical elements used with high energy lasers (HEL), such as the mirror disclosed and claimed in the commonly owned co-pending U.S. patent application entitled "Extendable Large Aperture Phased Array Mirror System", Ser. No. 114,540 employ large numbers of small segments to alter an optic surface to generate a conjugate wavefront. Displacement sensors indicate segment mirror surface tilt as well as displacement, and therefore must have an extremely stable zero point, have a wide dynamic range and be especially insensitive to environmental (e.g. thermal) changes. The very large number of segments mandates the use of thousands of displacement sensors. Consequently, sensors that have complex electronics or which are not amenable to minaturization and batch fabrication have limited utility. Moreover, sensors used with these phased array mirrors must display low sensitivity to changes in lateral gap between adjacent segments.

Several displacement sensor technologies have been developed for high precision applications. Included are optical sensors which typically comprise an emitter and detector located respective on opposing surfaces and which usually employ a digital grating. These sensors lack the subnanometer resolution and extremely stable zero point operation required for segmented adaptive optics elements.

Capacitive displacement sensors have been successfully used in certain applications, since they can be extremely stable and provide subnanometer resolution in conjunction with low complexity electronics. However, the individual sensors are comprised of a plurality of carefully fabricated and aligned discrete electromechanical parts and are therefore not practical for mirrors or other optical elements comprised of tens or hundreds of thousands of individual segments.

It would be advantageous to have a displacement sensor acceptable to miniaturization and batch fabrication, requiring no gap-bridging part, capable of subnanometer resolution with a wide dynamic range, and using very simple electronics. The present invention is directed towards such a sensor.

SUMMARY OF THE INVENTION

An object of the present invention is to provide a device for sensing in-plane or sliding displacement, along one axis, between two closely spaced parallel surfaces, and particularly useful where such surfaces are side surfaces of two adjacent segments of a segmented mirror or other active optical element requiring relative positioning to a precision equal a small fraction of the wavelength of the involved radiation.

Another object of the present invention is to provide a displacement sensor of the foregoing character for which there exists a null point which is insensitive to changes in the gap separation of the involved surfaces and to environmental changes, and which is capable of sub-nanometer resolution with a wide dynamic range.

According to the invention, a sensor for measuring parallel plane relative displacement along a given displacement axis of closely spaced generally parallel first and second surfaces, includes a first electrical coil pair disposed on the first surface with the two coils of the pair being spaced from one another along a reference axis substantially perpendicular to the displacement axis and displaced respectively in opposite directions from said reference axis. An oscillator circuit that includes the first coil pair also includes a second electrical coil pair disposed on the second surface. The two coils of the second coil pair are respectively tuned to a frequency above and below the circuit resonant frequency. The two coils of the second coil pair are also spaced from one another along a reference axis parallel to the first coil pair reference axis so that each is located generally opposite to and inductively coupled with an associated one of the coils of the first pair. The two coils of the second pair are also displaced respectively in opposite directions from said second reference axis, but in the way opposite to that of the first pair of coils. Therefore, as one surface moves relative to the other in one direction along the displacement axis, one set of inductively coupled coils moves toward greater coupling and the other set moves toward lesser coupling, and as such one surface moves in the opposite direction said one set of inductively coupled coils moves toward lesser coupling and said other set moves toward greater coupling. Therefore, relative surface displacements along the displacement axis generate inductance perturbation signals proportional thereto. Also included is detector circuitry which receives these perturbation signals and provides other signals indicative thereof.

BRIEF DESCRIPTION OF THE DRAWINGS

FIG. 1 is a simplified schematic illustration in perspective of an arbitrarily large aperture segmented mirror which includes a plurality of inductive displacement sensors provided according to the present invention.

FIG. 2 is a simplified perspective view of two adjacent optical segments of the mirror of FIG. 1.

FIG. 3 is a sectioned illustration of the adjacent optical segments of FIG. 2.

FIG. 4 is a perspective illustration of the adjacent optical segments of FIG. 2 detailing electical coils used with an inductive displacement sensor provided according to the present invention.

DETAILED DESCRIPTION OF THE PREFERRED EMBODIMENTS

Figure 5:
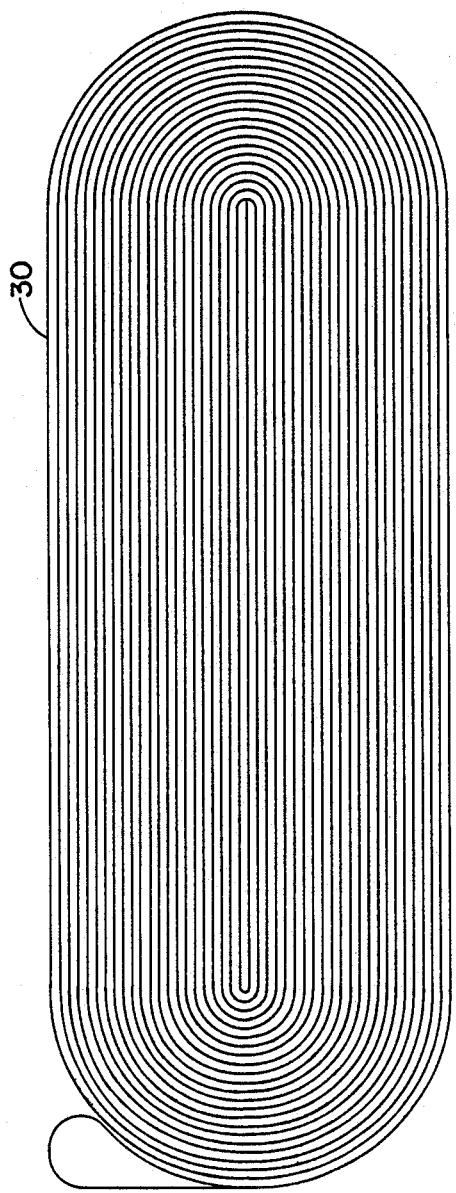
FIG. 5 is an illustration in plan of an inductive coil of FIG. 4.

Referring first to FIG. 1 there is shown in perspective a simplified schematic illustration of a segmented mirror 10 which is exemplary of active optical elements that employ the present invention. The mirror 10 is described and claimed in the commonly owned copending U.S. patent application entitled "Extendable Large Aperture Phased Array Mirror System", Ser. No. 114,540 and incorporated herein by reference. The mirror is comprised of a plurality of cooperative movable segments such as adjacent segments 12 and 14. As detailed hereinafter each segment, in cooperation with its adjacent segments, has a plurality of inductive displacement sensors associated with it and embodying the present invention.

Referring now to FIG. 2, segments 12 and 14 are seen to comprise first mirror surfaces 16 and 18, respectively, and a plurality of secondary side faces or surfaces perpendicular thereto. Typically these optical segments are hexagonal in shape and are configured to substantially abut along juxtaposed side surfaces such as the respective surfaces 20 and 22 of segments 12 and 14 shown in section in FIG. 3. Each segment is independently movable along a displacement axis 24 or 26 by the use of actuators, such as the illustrated actuators 27, 28 and 29, not part of the present invention.

For active or adaptive optics applications, it is imperative that adjacent optical segments be configured with matched edges along the optical surfaces. Consequently, a displacement sensor is needed which is capable of aligning the edges of adjacent segments to form what approximates a continuous phase sheet surface, and this must be done to an accuracy of a small fraction of the wavelength of the incident electromagnetic radiation.

An inductive displacement sensor provided according to the present invention comprises two pairs of inductive coils disposed on the two opposed surfaces of two adjacent optical segments as evident from FIG. 4. Referring to FIG. 4, first primary coils 30 and 31 are spaced along an axis 32 substantially on opposite sides thereof generally perpendicular to the axis 26 of segment displacement. Each coil is embedded in or etched into the side surface 33 of segment 12. Each coil 30 and 31 is substantially planar and located in a plane approximately parallel to the side surface 33. FIG. 5 is a detailed illustration clearly showing the oblong planar wound structure of coil 30. Although shown with an oblong geometry, those skilled in the art will understand that other equivalent geometries may be substituted.

Also in FIG. 4 there is schematically illustrated in phantom, secondary coils 34 and 36 which have approximately the same parameters as primary coils 30 and 31. These secondary coils are disposed on an opposed side surface of an adjacent segment, not shown. The two coils of the second coil pair are also spaced from one another along a reference axis parallel to the first coil pair reference axis so that each is located generally opposite to and inductively coupled with an associated one of the coils of the first pair. The two coils of the second pair are also displaced respectively in opposite directions from the second coil pair reference axis but in the way opposite to that of the first pair of coils. In other words, the secondary coils are displaced on the opposed side surface along an axis parallel to axis 32 in an alternating manner with respect to the primary coils and are positioned to partially overlap a respective one of the magnetic fluxes extending from primary coils.

A first set of inductively coupled coils is formed from one of the first primary coils with a corresponding one of the secondary coils. In FIG. 4, for example, primary coil 30 and secondary coil 34 form a first set of inductively coupled coils while primary coils 31 and secondary coil 36 form a second inductively coupled coil set. As one segment moves relative to adjacent segments in one direction along the displacement axis, for example segment 12 moving upward relative to segment 14 in FIG. 4, the second set of inductively coupled coils moves toward greater coupling and the first set of inductively coupled coils moves toward lesser coupling. Conversely, as segment 12 is moved downward along the displacement axis relative to segment 14, the first inductively coupled coiled set is moved toward increased coupling while the second coil set is moved towards a lesser coupling.

Figure 6:
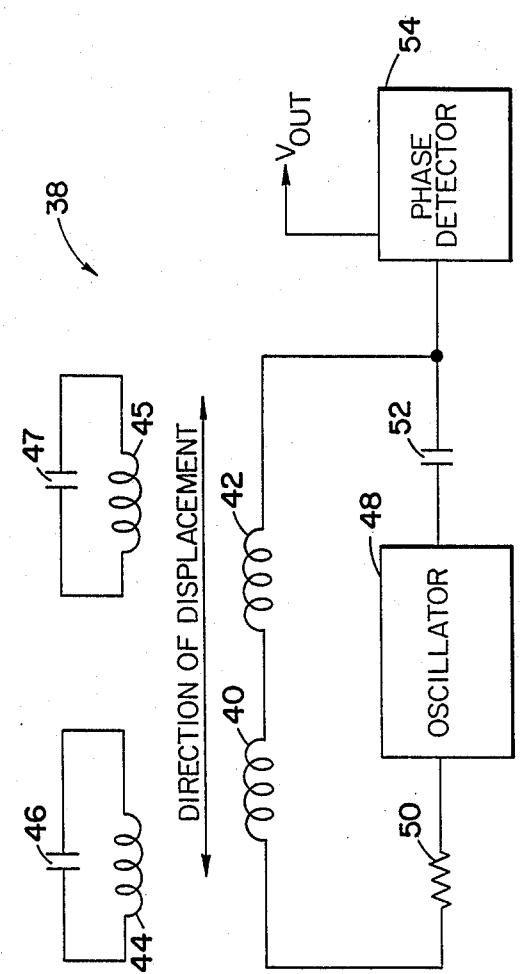
FIG. 6 is a simplified schematic illustration of an electrical control circuit used with an inductive displacement sensor provided according to the present invention.

Referring now to FIG. 6, this shows in simplified schematic format, the circuit 38 of the inductive displacement sensor of FIG. 4. Symbols 40 and 42 illustrate the inductance of coils 30 and 31, respectively. Similarly, symbols 44 and 45 represent the inductance of coils 34 and 36, respectively. Symbols 46 and 47 correspond to the respective capacitance associated with coils 44 and 45, respectively which may be the capacitance of that coil or a discrete capacitive element. Circuit 38 includes a conventional oscillator 48 with series resistance 50 and capacitance 52.

In operation, circuit 38 is resonant. One secondary coil and its associated capacitance is tuned slightly above the resonance frequency while the other secondary coil and its associated capacitance is tuned slightly below resonance. The primary coils 30 and 31 inductively couple to secondary coils 34 and 36 on the opposed surface of the adjacent segment as detailed hereinabove. Any relative motion along the displacement axis between the opposed segment surfaces perturbs the resonant circuit signal by changing the complex impedance of the circuit which produces a change in the phase relationship between the circuit signal's current and voltage. This phase change is sensed by phase detector 54 and is used to produce a feedback control signal for the segment actuators (not shown). The phase change is linearly related to the displacement between the segment edges.

A key feature of an inductive displacement sensor provided, according to the present invention, is that the tuned secondary coils are completely passive, and therefore no wires or other apparatus need bridge the gap between segments. Existing capacitive displacement sensors, such as the Keck sensor described hereinabove, have the disadvantage of mechanical and electrical coupling between adjacent segments.

A signal null point of an inductive displacement sensor provided according to the present invention is defined by the plane of symmetry where the primary coils equally couple with both of the secondary coils. Since the impedance of the secondary coils can be tuned, the circuit 38 can be made both extremely sensitive and linear. Moreover, the null point is insensitive to changes in segment gap or temperature. The necessary signal conditioning electronics is of very low complexity, and can be easily implemented with well known low power CMOS technology. It is preferred that the circuit 38 be conventionally fabricated to allow for local positioning directly with the segment.

An inductive displacement sensor provided according to the present invention can resolve 10 nanometer misalignment of adjacent segment surface edges with accuracy at the null point of at least 50 nanometers. Moreover, the full measurement range is at least 200 microns, and has a frequency response of at least 5 kilohertz. In the preferred embodiment, adjacent side surfaces of each segment will possess primary and secondary coils configured as described herinabove. Consequently, each segment will have three primary coil pairs and three secondary coil pairs formed on alternate side surfaces of a segment.

For segments as described hereinabove with respect to FIG. 2 an inductive displacement sensor system therefore comprises three inductive sensors whose primary coils are disposed on alternate segment side surfaces and whose oscillator circuitry can be locally configured with the segment shown generally at 54, FIG. 3, or remotely located. The segment sensor corresponding secondary coil pairs are disposed on respective side surfaces of adjacent segments.

Similarly, although the invention has been shown hereinabove with respect to a preferred embodiment, those skilled in the art will note that certain additions, substitutions and deletions thereto can be made therein within the spirit and scope of the present invention.

We claim:

1. A sensor system for use in measuring parallel plane or sliding plane displacement along a displacement axis between a first segment and a plurality of adjacent segments, each segment having a face perpendicular to said displacement axis and a plurality of side surfaces generally parallel to said displacement axis opposite corresponding side surfaces on said adjacent segments, said sensor system comprising:

a plurality of first and second electrical coil pairs disposed on alternate side surfaces of said first segment spaced from one another along a first axis substantially perpendicular to said displacement axis; each of said coils having an associated capacitance forming a plurality of associated first and second resonant circuits having resonant frequencies above and below, respectively, associated oscillator circuit resonant frequencies;

a plurality of oscillating circuits capable of oscillating at a respective one of said oscillator circuit resonant frequencies, and each of said oscillator circuits having an electrical coil pair disposed on a side surface of an adjacent segment opposite the first segment side surface having said associated first and second resonant circuits, with the two coils of said pair being alternately spaced from one another along a second axis parallel to said first axis and substantially perpendicular to said displacement axis, each coil of said pair positioned to be capable of at least partially inductively coupling with a respective one of said associated first and second resonant circuits such that, when said associated oscillator circuit is energized, relative displacement of said first and second surfaces along the displacement axis perturbs the complex impedance of said energized oscillator circuit by an amount in proportion to said displacement to produce a perturbation signal indicative of a change in phase between the current and voltage of said energized oscillator circuit signal; and detector circuitry for providing signals indicative of said perturbation signal.

2. The apparatus of claim 1 wherein said detector and oscillator circuits are locally positioned with said first segment.

3. The system of claim 1 wherein said detector circuitry comprises a phase detector.

4. The system of claim 1 wherein said planar coils are deposited on said surfaces.

5. The system of claim 1 wherein said electrical coils comprise a substantially circular planar coil.

6. The system of claim 1 wherein each of said electrical coils comprise a substantially oblong planar coil.

7. A sensor for use in measuring parallel plane or sliding displacement along a given displacement axis of closely spaced genealogy parallel first and second surfaces, said sensor comprising;

first and second electrical coils disposed on said first surface alternately spaced from one another along a first axis substantially perpendicular to said displacement axis, each of said coils having an associated capacitance forming first and second resonant circuits having resonant frequencies above and below, respectively, an oscillator circuit resonant frequency; and an oscillator circuit capable of oscillating at said oscillator circuit resonant frequency, and having an electrical coil pair disposed on said second surface, with the two coils of said pair being alternately spaced from one another along a second axis parallel to said first axis and substantially perpendicular to said displacement axis, each coil of said pair positioned to be capable of at least partially inductively coupling with a respective one of said first and second resonant circuits such that, when said oscillator circuit is energized, relative to displacement of said first and second surfaces along the displacement axis perturbs the complex impedance of said energized oscillator circuit by an amount in proportion to said displacement to produce a signal indicative of a change in phases between the current and voltage of said energized oscillator circuit signal.

8. The apparatus of claim 7 wherein said planar coils are deposited on said surfaces.

9. The apparatus of claim 7 wherein each of said electrical coils comprises a substantially circular planar coil.

10. The apparatus of claim 7 wherein each of said electrical coils comprises a substantially oblong planar coil.

* * * * *

UNITED STATES PATENT AND TRADEMARK OFFICE
CERTIFICATE OF CORRECTION

PATENT NO. : 4,816,759
DATED : March 28, 1989
INVENTOR(S) : Gregory H. Ames, William A. Holmgren, A. Lee Widener It is certified that error appears in the above-identified patent and that said Letters Patent is hereby corrected as shown below:

Column 1

Line 22, delete "Berkely" and substitute --Berkeley--.

Line 30, delete "co-pending" and substitute --copending--.

Column 2

Line 18, delete "sub-nanometer" and substitute --subnanometer--.

Line 64, delete "electical" and substitute --electrical--.

Column 3

Line 8, after "1" insert --,--.

Line 18, after "hereinafter" insert --,--.

Line 25, after "Typically" insert --,--.

Line 58, after "4" insert --,--.

Column 4

Line 32, after "respectively" insert --,--.

Line 54, after "provided" delete ",".

UNITED STATES PATENT AND TRADEMARK OFFICE
CERTIFICATE OF CORRECTION

PATENT NO. : 4,816,759

DATED : March 28, 1989

INVENTOR(S) : Gregory H. Ames, William A. Holmgren, A. Lee Widener

It is certified that error appears in the above-identified patent and that said Letters Patent is hereby corrected as shown below:

Column 5

Line 14, delete "herinabove" and substitute--hereinabove--.

Line 19, after "2" insert--,--.

Column 6

Line 12, delete "apparatus" and substitute--system--.

Line 23, after "sensor" insert--apparatus--.

Line 25, delete "genealogy" and substitute--generally--.

Line 26, delete ";" and substitute--:--.

Signed and Sealed this

Twenty-fourth Day of October, 1989

*Attest:*

DONALD J. QUIGG

*Attesting Officer*      *Commissioner of Patents and Trademarks*